United States Patent Office 3,301,693
Patented Jan. 31, 1967

3,301,693
CYCLIC ACETAL COATING COMPOSITIONS
Carol K. Ikeda, Wallingford, Pa., assignor to E. I. du Pont de Nemours and Company, Wilmington, Del., a corporation of Delaware
No Drawing. Original application Mar. 16, 1961, Ser. No. 96,101, now Patent No. 3,255,210, dated June 7, 1966. Divided and this application May 13, 1965, Ser. No. 455,589
6 Claims. (Cl. 106—176)

This application is a divisional of copending application Serial No. 96,101, filed March 16, 1961, now U. S. Patent 3,255,210.

This invention relates to cyclic acetals and particularly to a certain class of polyunsaturated cyclic acetals.

I have found that products which are useful particularly in the coating art are produced when a member of this class of material is aerated, such as by bubbling air therethrough for a prolonged period. The aerated compositions are useful primarily as an additive to or substitute for the oil, varnish, resin or other film-forming material used to make transparent coatings or to bind together the pigment or dye particles in colored coatings.

Products of this invention with metal drier present dry very rapidly in air at room temperature. They have viscosities which can be controlled and usually are in the upper portion of the broad range of viscosities used in the organic coating industry. These high range viscosities are particularly useful in regulating the application, smoothness and flow-out properties of coatings embodying these products. The products are also good pigment dispering media, a necessary property for manufacturing reproducible and saleable pigmented enamels. The products further are compatible with a broad range of film-forming materials which are well established in the organic coating art. This property provides the coating formulator with desirable latitude to modify the film-forming materials of this invention with those of the prior art, or vice versa, to produce coatings having simultaneously the optimum advantages of each component. In addition, products of this invention have the property of rapid and excellent wetting of relatively hydrophilic surfaces which are normally painted and depend on wetting for its contribution to the ultimate protection afforded by an adherent coating.

The starting materials for the process and products of this invention are cyclic acetals which in their convenient pure or crude forms are liquid at normal industrial working-area temperatures, e.g. 60°–90° F., and which contain a plurality of 1,3-cyclic acetal radicals, said radicals having a vinyl or isopropenyl substituent in the 2-position and being connected to each other through an interposed polyvalent radical.

Materials fulfilling these requirements are known in the art and are represented by the following:

Orthophthalic acid diester of 4-(omega hydroxybutyl)-2-vinyl-1,3-dioxolane.[1] Other names for this compound

[1] This compound has the structural formula:

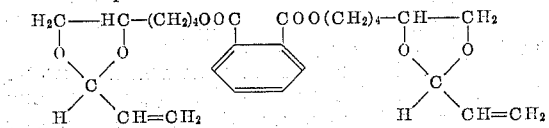

are bis(2-vinyl-1,3-dioxolane-4-butyl) orthophthalate and bis[4-(2′-vinyl-1′,3′-dioxolane - 4′ - yl)butyl] orthophthalate. This general relation between different names for the same compound is applicable to related compounds disclosed herein.

Itaconic/mesaconic/citraconic acid mixed isomeric diester of 4-(omega hydroxybutyl)-2-vinyl-1,3-dioxolane.

Itaconic acid diester of 4-(omega hydroxybutyl)-2-vinyl-1,3-dioxolane.

Sebacic acid diester of 4-(omega hydroxybutyl)-2-vinyl-1,3-dioxolane.

The corresponding di- and higher esters of the following polycarboxylic acids: malonic, succinic, glutaric, adipic, pimelic, suberic, maleic, citraconic, mesaconic, dimerized and trimerized vegetable oil acids (predominantly $C_{18}$ unsaturated vegetable oil acids), ortho-, iso-, and terephthalic acids and their di-, tetra, and hexahydrophthalic counterparts, hemimellitic, pyromellitic and mellitic acids, diglycolic, hydroxysuccinic and its etherified counterparts.

Also representative of starting materials for use in this invention is the orthophthalic acid diester of 4-hydroxymethyl-2-vinyl-1,3-dioxolane.[2]

Likewise included are esters of this hydroxymethyl substituted dioxolane and the other acids set forth directly above in connection with the disclosed esters of hydroxybutyl substituted dioxolane.

In addition to ester structures linking two or more residues of the above mentioned dioxolanes, ether linkages may be used as in bis[(2-vinyl-1,3-dioxolan-4-yl)methyl] ether and symmetrical bis[(2-vinyl - 1,3 - dioxolan - 4 - yl) methoxy]ethylene; or urethane linkages can be used as in bis[(2-vinyl - 1,3 - dioxolan-4-yl)butyl]-2′,4′-tolylene dicarbamate.

Also, related dioxanes or dioxepanes can be used such as the orthophthalic, sebacic and itaconic acid diesters of 5-hydroxymethyl-5-ethyl - 2 - vinyl - 1,3 - dioxane, or the orthophthalic acid diester of 4-(omego hydroxypropyl)-2-vinyl-1,3-dioxepane.

Further starting materials useful in this invention are those disclosed above with the isopropenyl radical, i.e.

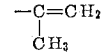

substituted for the vinyl radical, i.e. —CH=CH₂, in the 2-position of the cyclic acetal ring.

The preferred starting materials are diesters of a dicarboxylic (e.g. phthalic or $C_3$–$C_{10}$ aliphatic) acid and an omega hydroxyalkyl (e.g. hydroxymethyl to hydroxybutyl) substituted 1,3-cyclic acetal (e.g. dioxolane, dioxane, dioxepane).

The process of this invention consists essentially of aerating or oxygenating material of the type previously described, either alone or mixed with other material not adversely affected by the treatment. The process is carried out generaly by treating a mass of such a material with gaseous oxygen whereby said mass is intimately contacted throughout with oxygen.

[2] This compound has the structural formula:

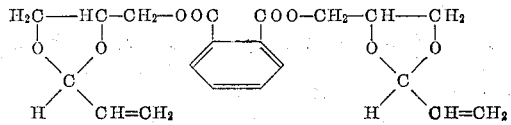

A preferred form of this process involves bubbling air, oxygen, or a mixture of oxygen with innocuous gas through a body of such a material. The bubbling rate is preferably such that the resulting turbulence is like violently boiling water. The preferred temperature is about 75°–150° C., and the time is preferably kept within the convenient range of about 20 minutes to 7 or 8 hours, with the shorter time periods usually accompanying the higher temperatures and vice versa.

In alternative process variations, modifiers can be included such as small proportions of soluble metallic driers of the type used in the organic coating industry, or sources of free radicals, e.g. azobisnitriles and peroxy compounds. The process can be carried out under ultraviolet or actinic radiation.

Mechanical agitation can be used as a supplement to the spontaneous mixing effect of bubbling. This is especially true when a costly form of oxygen is used and the bubbling rate is minimized to reduce losses.

With other operating conditions remaining the same, the degree of change effected by the process usually increases with time, temperature and amount of oxygen supplied. Therefore when one is increased, one or both of the others are usually decreased to provide an element of convenience in controlling the process. In general, temperatures approaching the boiling, ignition or decomposition temperatures of the starting material or the product are avoided, and about 250° C. is a maximum convenient temperature. However, room temperature or lower, e.g. 15°–35° C., can be used with starting materials which become oxygenated rapidly and/or which are readily volatilized, or where a long process time can be tolerated. The time of processing can be from a few minutes, e.g. 10, to several hours, e.g. as much as 24–28 hours or longer if convenient. Since gelation can result from one or more of the time, temperature and oxygen consumption factors, and ungelled products are preferred, the overall conditions are preferably adjusted by experience to produce the viscosity and degree of oxygenation desired.

Still further modifications of the process of this invention include exposing the vapor, droplets or a falling film of cyclic acetal to oxygen under suitable time and temperature conditions or, instead of bubbling oxygen through a mass, whipping oxygen into it by violent agitation under an oxygen-containing atmosphere.

The products of the process of this invention appear to be complex mixtures of a wide variety of substances. Even the lightly oxygenated product from a given starting material appears to be substantially different in complexity than its heavily oxygenated counterpart, each having different properties and/or different degrees of the same or related properties. The preferred products have consistencies between the readily pourable and the highly viscous stages, form continuous films, convert to dry coatings which are insoluble in a solvent for the starting material, are good pigment dispersing media, are compatible with other film-forming materials and have other desirable properties of coating materials.

Some of the products of the process of this invention are readily pourable. These lend themselves to the easy preparation of solvent-free liquid end products, a type especially desirable because the wet coating yields substantially its own thickness of dry coating, and the cost and fire hazard of solvents are eliminated. However, the products which are highly viscous can be combined with more fluid coating materials or with common solvents and can be used in solution form.

Suitable solvents include aliphatic and aromatic liquid hydrocarbons, esters, ketones, alcohols and mixtures thereof.

Products of the process of this invention can be used in clear, unpigmented coating compositions, with solvent if required for convenience of application. They can be pigmented, using proportions well known in the art, with common coating-grade pigments, such as metal oxides, sulfides, sulfates, silicates, chromates, carbon blacks, iron blues, organic colors, and metal flake pigments. As is the case with other air-drying materials, some pigments inhibit drying. These are to be avoided in coating compositions formulated to dry at ordinary temperatures, but they can be used if the coatings can be force-dried or baked.

Individually or mixed, the products of the process of this invention can be the sole organic film-forming component of coating compositions, or they can be blended with other known film-formers such as glyceride oils and their synthetic counterparts, polyesters, oil-modified alkyd resins, oleoresinous varnishes, unsaturated cyclic acetals, alkylated urea aldehyde resins, alkylated melamine aldehyde resins, polyepoxypolyhydroxy resins, phenol aldehyde resins, cellulose acetate, cellulose acetate butyrate, polymers and copolymers of vinyl and vinylidene compounds such as vinyl chloride, vinylidene chloride, vinyl acetate, acrylic and methacrylic acid and the esters thereof, styrene, butadiene, and the like; polymerizable liquids like the dimethacrylates of glycols and polyglycols; elastomers such as neoprene, styrene-butadiene rubbers, acrylonitrile-butadiene rubbers and isobutylene-isoprene rubbers; polyurethanes, and silicones.

Other common ingredients of organic film-forming compositions can be used in the manner and in proportions well known in the art. These include plasticizers, catalysts, hardeners, anti-skinning agents and surface active agents. Particularly included in this class of additives are metallic drivers, i.e. the commonly used naphthenate, linoleate, resinate, tallate, octoate(2-ethyl hexoate) or other salts or soaps of siccative metals such as cobalt, lead, iron, manganese, zinc, calcium, nickel and copper. Such driers are commonly used in the organic art to speed up the drying and ultimate insolubilization of air-drying compositions, and they have a similar effect on the oxygenated products and the compounded coating compositions of this invention. Thus, compositions derived from the new oxygenated products preferably contain one or more of such driers. A particularly preferred drier metal is cobalt. The proportion of drier is usually within the range of 0.0005%–3% of metal (in the drier) based on the weight of air-drying film-forming material.

It is well known that the drying speed of air-drying compositions can be increased not only by adding drier but also by heating, or a combination thereof. The drying of compositions containing oxygenated products of this invention can likewise be hastened. Temperatures moderately above room-temperature, e.g. 100°–150° F., usually hasten drying enought but, where desirable, the compositions can be baked at higher temperatures e.g. 200°–400° F. for short periods.

The products of this invention are useful primarily in paints, enamels, varnishes, other coatings and related materials for protecting and decorating architectural and industrial structures, furniture, automobiles, appliances for home and industry, linoleum, coated or impregnated fabrics and the like. Such coatings are applied by conventional methods including brushing, spraying, roller coating, knifing and dipping.

Although from the manufacturing standpoint it would usually be inconvenient to oxygenate by the process of this invention an otherwise finished product (paint, for example) containing a cyclic acetal of the type hereinbefore defined as a starting material, this can be done before the coating is used, whereby one or more of the advantages of this invention will be obtained.

The following examples illustrate the principles and practice of this invention, but they are not to be interpreted as limitations of the invention. Unless otherwise indicated, the parts and percentages are given by weight. Viscosities are given at 25° C.

It is to be understood that the aforementioned starting materials can be substituted for all or part of a corresponding material in these examples and that analogous results will be produced. Quite naturally, such substitution suggests minor adjustments in conditions such as temperature and time. Also different degrees of the resulting properties are to be expected from different starting materials, as is illustrated.

EXAMPLE 1

One gallon (9.55 pounds) of the orthophthalic acid diester of 4-(omega hydroxybutyl)-2-vinyl-1,3-dioxolane is placed in a five liter, three necked flask equipped with a thermometer, agitator and an air blowing tube extending to the bottom. The viscosity of this starting material is approximately N in the Gardner-Holdt bubble tube series.

The material in the flask is quickly heated and held at 119°–127° C. while blowing air therethrough at a rate such that the material appears to be boiling violently. Vigorous mechanical agitation is applied to supplement the spontaneous mixing action of the air. Thereby oxygen of the air is brought into intimate contact with the whole mass of the material being treated.

One pint samples taken at intervals and promptly cooled to room temperature have the following properties:

*Table 1*

| Sample | Time [1] | Gardner-Holdt Viscosity | | Drying Time | |
|---|---|---|---|---|---|
| | | Original | 5 Days | Dust-free, hrs. | Tack-free, hrs. |
| 1 (Orig.) | 0 | N | N | 5 | 8 |
| 2 | 25 | S | Not Measured. | 5 | 8 |
| 3 | 70 | T+ | Not Measured. | 4.5 | 8 |
| 4 | 90 | U+ | U+ | 4 | 8 |
| 5 | 150 | Y | Y+ | 3 | 7.75 |
| 6 | 155 | Z2− | Z3 | 2.5 | 7.5 |

[1] Time is in minutes elapsed at operating temperature.

The "5 days" viscosity is measured after the sample is permitted to stabilize in a closed can for five days at room temperature.

Drying times are determined on the 5-day material by admixing 0.05% cobalt metal in the form of a xylene solution of cobalt butyl phthalate in each sample, drawing a test coating under a doctor blade (2.4 mil clearance) on a glass panel, allowing the coating to dry in air at room temperature (25° C.) and recording when its surface is dry enough not to stick air-borne lint or dust (dust-free) and when the coating subsequently loses its tackiness (tack-free).

All of the resulting films are glossy and rapidly become tough and adherent.

Illustrative pigmented coating compositions of this invention are prepared by separately grinding each of the eight formulas set forth above by the said grinding process of U.S. 2,581,414 to produce finely ground pigment dispersions. All of these are useful as coating compositions without further modification. They are particularly useful for roller coating sheets of tin plate which are cut and formed into general purpose cans, with the enamelled side facing out.

The gloss values are determined on films cast at a thickness of about 2 mils and backed for 20 minutes in an oven at 325° F. The values are obtained on an instrumental reflectance comparator. All of the values represent glossy coatings, but the highest value (93) represents an extremely high sharp gloss.

EXAMPLE 3

A quantity of the starting material of Example 1 is admixed with 0.002% of cobalt in the form of a cobalt butyl phthalate solution in xylene. The resulting mixture is treated by vigorously bubbling air therethrough in an open vessel at 105°–135° C. for three hours and ten minutes, followed by rapid cooling to room temperature. The product has a viscosity of X.

Clear and pigmented coatings prepared from this product in the manner described in the preceeding examples have properties similar to the coatings of those examples.

EXAMPLE 4

Approximately one half gallon of itaconic/mesaconic/citraconic acid mixed isomeric diester of 4-(omega hydroxybutyl) - 2 - vinyl-1,3-dioxolane is placed in a three liter flask equipped as described in Example 1. It is treated at 118°–125° C. by the process of that example.

Half-pint samples taken at intervals and promptly cooled to room temperature have the following properties:

EXAMPLE 2

| | Parts by Wt. | | | | | | | |
|---|---|---|---|---|---|---|---|---|
| | 1A | 4A | 5A | 6A | 1B | 4B | 5B | 6B |
| Sample 1 of Example 1 | 800 | | | | 680 | | | |
| Sample 4 of Example 1 | | 800 | | | | 680 | | |
| Sample 5 of Example 1 | | | 800 | | | | 680 | |
| Sample 6 of Example 1 | | | | 800 | | | | 680 |
| Alkyd resin solution (43% soya oil modified glyceryl phthalate resin; 54% solids in aromatic paint solvent) | | | | | 222 | 222 | 222 | 222 |
| Titanium dioxide pigment | 880 | 880 | 880 | 880 | 880 | 880 | 880 | 880 |
| Cobalt (in form of cobalt drier solution) | 0.4 | 0.4 | 0.4 | 0.4 | 0.4 | 0.4 | 0.4 | 0.4 |
| Gloss Value | 72 | 67 | 73 | 73 | 78 | 90 | 90 | 93 |

Table II

| Sample | Time | Gardner-Holdt Viscosity | | Drying Time | |
|---|---|---|---|---|---|
| | | Original | 1 Month | Dust-free, hrs. | Tack-free, hrs. |
| 1 | 0 | G | G | 3.5 | 5 |
| 2 | 20 | M | N | 3 | 4.5 |
| 3 | 40 | U+ | Y | 2.5 | 3.75 |
| 4 | 70 | Z5 | Gel | | |

The information recorded has the significance set forth following Table I. The films prepared for test purposes are all glossy and rapidly become tough and adherent. They represent clear coatings which are generally useful for purposes mentioned above. The gelled sample is useful in linoleum and other milled coatings.

In addition to being generally useful in coating compositions of the type described hereinbefore, the two products of this example identified as samples 2 and 3 are particularly useful in so-called aerosol or self-spraying enamels, as described in the next example which uses sample 3 for illustration.

EXAMPLE 5

| First portion: | Parts by wt. |
|---|---|
| Sample 3 of Example 4 | 100 |
| Sample 6 of Example 1 | 100 |
| Titanium dioxide pigment | 200 |
| Second portion: | |
| Toluene | 133 |
| Drier solution (xylene solution of cobalt butyl phthalate, assay 4% cobalt) | 7.5 |
| Third portion (propellent): | |
| Trichloromonofluoromethane | 186 |
| Monochlorodifluoromethane | 186 |

The self-spraying enamel of this example is prepared by grinding a batch of the ingredients of the first portion, in the proportions indicated, in conventional paint grinding equipment until a smooth dispersion is obtained. Then 400 parts of this batch are admixed with the second portion. Finally, this mixture is loaded into a can designed to be caped with a spray head, the can is charged with the propellent of the third portion and capped as indicated.

Shaking for a while readies the product for spraying. A smooth even coat is sprayed on a clean previously painted chair and is allowed to dry overnight at room temperature. A dry, glossy, tough and adherent enamel coating is produced.

EXAMPLE 6

| First portion: | Parts by wt. |
|---|---|
| Poly (methyl methacrylate) solution (40% solids in 2:1 toluene:acetone, viscosity Z) | 150 |
| Xylene | 69 |
| Ethylene glycol monoethyl ether acetate | 69 |
| Second portion: | |
| Sample 3 of Example 4 | 90 |
| Sample 5 of Example 1 | 55 |
| Sample 4 of Example 1 | 95 |
| Third portion: | |
| Benzoyl peroxide | 4.8 |
| Drier solution (xylene solution of cobalt butyl phthalate, assay 4% cobalt) | 3 |

The coating composition of this example is prepared by mixing the ingredients of the first portion, adding thereto with agitation the pre-mixed ingredients of the second portion, and finally admixing in the resulting mixture the ingredients of the third portion.

The resulting clear lacquer-like product can be applied by dipping or brushing without modification. For easy spraying, it is thinned with toluene. Coatings thus applied in sufficient amount to yield a dry coating 2-3 mils thick become dust-free in 9–10 minutes and tack-free in 90 minutes when exposed to air at normal room temperature. Thus the product is particularly useful where very rapid drying is desirable.

EXAMPLE 7

The procedure of Example 1 is repeated except that technical grade compressed oxygen is substituted for air as the bubbling medium and the treatment is carried out at 24°–26° C. (room temperature) for 7 hours. A second batch is similarly treated but for 6 hours and 15 minutes at 79°–80° C.

The first treated product has a viscosity of O- and dries to the tack-free stage in 4.5 hours.

The second treated product has a viscosity of U and dries to the tack-free stage in 3.5 hours.

Both of the products of this example are useful not only in the form described in this example but also in the other kinds of coating compositions described hereinbefore.

EXAMPLE 8

| First portion: | Parts by wt. |
|---|---|
| Copolymer solution (98% methyl methacrylate, 2% methacrylic acid; 40% solids in 3:1 toluene:acetone; viscosity Z2) | 65 |
| Titanium dioxide | 130 |
| Second portion: | |
| Sample 6 of Example 1 | 76.5 |
| Drier solution (xylene solution of cobalt butyl phthalate, assay 4% cobalt) | 2.5 |
| Xylene | 125 |
| Third portion (propellent): | |
| Trichloromonofluoromethane | 106 |
| Monochlorodifluoromethane | 160 |

The self-spraying enamel of this example is prepared and loaded in a spray can in accordance with the procedure of Example 5.

A coating sprayed from this can dries dust-free in about 15 minutes and tack-free in 90 minutes.

EXAMPLE 9

| | Parts by wt. |
|---|---|
| Cellulose acetate butyrate, half-second grade, solution (25% solids in 1:1 methyl ethyl ketone: Cellosolve acetate) | 100 |
| Sample 5 of Example 1 | 45 |
| Itaconic acid diester of 4-(omega hydroxybutyl)-2-vinyl-1,3-dioxolane | 30 |
| Cadmium red medium, pigment | 50 |
| Drier solution (xylene solution of cobalt butyl phthalate, assay 4% cobalt) | 1.4 |
| Xylene | 25 |

This coating composition is prepared by grinding the pigment, half of the Cellulose acetate butyrate solution and all of the "Sample 5" ingredient in conventional grinding equipment until a smooth dispersion is produced. Then the remainder of the formula is added and mixed. The resulting product is a fast-drying red enamel in a concentrated form convenient for distribution and ultimate use in, for example, the automobile refinishing trade.

An automobile body is refinished with this product by thinning one gallon of it to suitable spraying viscosity with approximately 3 pints of a 4:1 mixture of methyl ethyl ketone:Cellosolve acetate, followed by spraying the thinned product in a conventional manner. Application properties, flow, smoothness and freedom from sagging or curtaining fulfill the requirements of the trade.

The resulting coating becomes dust-free in 30 minutes. Within 4 hours it reaches the stage where tape (placed on the newly painted surface to hold masking paper in place while a contrasting second color is applied elsewhere on the automobile) does not mar the surface.

A glossy, good looking and durable refinish job is thus produced.

EXAMPLE 10

A mass of the orthophthalic acid diester of 4-(omega hydroxybutyl)-2-vinyl-1,3-dioxolane is placed in a shallow vessel whereby a large area of said diester is exposed to the air above it. Agitation is provided so that the surface is continuously renewed and material exposed to the air is continuously mixed into the mass. An ultraviolet lamp is placed close to the surface to expose it to continuous ultraviolet radiation. Conducting this process for 7 hours at room temperature produces a viscous liquid which air-dries to the tack-free stage in 5 hours at room temperature in the presence of cobalt drier (0.075% cobalt based on the viscous liquid).

This product is useful not only in the form prepared but also in the other kinds of coating compositions described hereinbefore.

EXAMPLE 11

A mixture of equal parts of the itaconic acid and orthophthalic acid diesters, respectively, of 4-(omega hydroxybutyl)-2-vinyl-1,3-dioxolane is oxygenated by the procedure of Example 1 for 45 minutes at 120°–130° C.

The resulting product has a viscosity of Z2. It air-dries to the tack-free stage in 3.5 hours at room temperature in the presence of cobalt drier (0.05% cobalt based on the oxygenated product). It is generally useful in the kinds of coating compositions described herein.

EXAMPLE 12

A mass of the sebacic acid diester of 4-(omega hydroxybutyl)-2-vinyl-1,3-dioxolane containing 0.05% cobalt in the form of cobalt butyl phthalate is oxygenated by the procedure of Example 1 for 4 hours at 25°–32° C.

The resulting product has a viscosity higher than any tube in the Gardner-Holdt series and is therefore assigned the value Z5+.

A coating drawn on clean steel under a 4.2 mil doctor blade is tack-free after a ten minute bake in an oven at 100° C.

A similar coating prepared at the end of a work day and allowed to stand at room temperature is tack-free the following morning.

This product is generally useful in the kinds of coating compositions described herein.

EXAMPLE 13

A mass of the orthophthalic acid diester of 2-vinyl-5-ethyl-5-methylol-1,3-dioxane containing 0.1% t-butyl perbenzoate is oxygenated by vigorous stirring in a flask under an atmosphere of oxygen at 115° C. for 2.75 hours.

A 75% solids solution of the resulting product in toluene has a viscosity of W compared to a viscosity of A for a 75% solution of untreated ester.

A coating of the oxygenated product drawn on clean steel under a 4.2 mil doctor blade is tack-free after a twenty minute bake in an over at 150° C.

For the purpose of testing the product of this example for air-drying properties, 0.05% cobalt in the form of cobalt butyl phthalate is admixed with a sample of the product. A coating of this drawn on clean steel under a 4.2 mil doctor blade is tack-free after about 7 hours exposure to air at room temperature.

The baking and air-drying products of this example are useful in the kinds of coating compositions described herein.

It is to be understood that the auxiliary materials used in the foregoing examples, such as pigments, solvents, propellents, added resins and polymers and the like, merely illustrate a few of the wide variety of such materials that can be used. As will be obvious to persons skilled in the art, other such materials can be used in the same or other proportions.

In the light of the teachings herein, many widely different embodiments can be made within the spirit and scope of the invention, which is limited only as indicated in the appended claims.

The claims are:

1. A coating composition consisting essentially of a product prepared by oxygenating a liquid cyclic acetal by contacting said cyclic acetal throughout its mass with gaseous oxygen, said cyclic acetal containing a plurality of 1,3-cyclic acetal radicals which have in their 2-positions substituents of the class consisting of vinyl and isopropenyl radicals, and which are connected to each other through an interposed polyvalent radical, and a siccative metal drier.

2. The coating composition of claim 1 additionally containing a pigment.

3. The coating composition of claim 1 containing another organic film-forming material.

4. The composition of claim 1 in which the cyclic acetal is the orthophthalic acid diester of 4-(omega hydroxybutyl)-2-vinyl-1,3-dioxolane.

5. The composition of claim 1 in which the cyclic acetal is the itaconic acid diester of 4-(omega hydroxybutyl)-2-vinyl-1,3-dioxolane.

6. The composition of claim 1 in which the cyclic acetal is the itaconic/mesaconic/citraconic acid mixed isomeric diester of 4-(omega hydroxybutyl)-2-vinyl-1,3-dioxolane.

References Cited by the Examiner

UNITED STATES PATENTS

| | | | |
|---|---|---|---|
| 3,010,918 | 11/1961 | Ikeda | 260—340.7 |
| 3,010,923 | 11/1961 | Ikeda | 260—340.9 |
| 3,010,945 | 11/1961 | Ikeda | 260—78.3 |

ALEXANDER H. BRODMERKEL, *Primary Examiner.*

D. J. ARNOLD, *Assistant Examiner.*